(12) United States Patent
Eguchi et al.

(10) Patent No.: US 9,422,416 B2
(45) Date of Patent: Aug. 23, 2016

(54) RESIN COMPOSITION

(75) Inventors: Kenichiro Eguchi, Amagasaki (JP);
Motoshi Tamura, Amagasaki (JP)

(73) Assignee: SHIRAISHI CENTRAL LABORATORIES CO., LTD., Amagasaki, Hyogo (JP)

( * ) Notice: Subject to any disclaimer, the term of this patent is extended or adjusted under 35 U.S.C. 154(b) by 0 days.

(21) Appl. No.: 13/988,932

(22) PCT Filed: Nov. 8, 2011

(86) PCT No.: PCT/JP2011/075710
§ 371 (c)(1),
(2), (4) Date: May 22, 2013

(87) PCT Pub. No.: WO2012/073660
PCT Pub. Date: Jun. 7, 2012

(65) Prior Publication Data
US 2013/0237658 A1    Sep. 12, 2013

(30) Foreign Application Priority Data

Nov. 30, 2010  (JP) ................................ 2010-267182

(51) Int. Cl.
*C08K 3/26* (2006.01)
*C09C 1/02* (2006.01)

(52) U.S. Cl.
CPC . *C08K 3/26* (2013.01); *C09C 1/021* (2013.01); *C09C 1/022* (2013.01); *C01P 2004/61* (2013.01); *C01P 2004/62* (2013.01); *C01P 2006/12* (2013.01); *C08K 2003/265* (2013.01); *C08K 2201/003* (2013.01); *C08K 2201/006* (2013.01)

(58) Field of Classification Search
CPC .. C09C 1/021; C09C 1/022; C08K 2003/265; C08K 3/26
USPC ......................... 524/425, 426, 427
See application file for complete search history.

(56) References Cited

U.S. PATENT DOCUMENTS

| | | | |
|---|---|---|---|
| 4,102,853 A | 7/1978 | Kawamura et al. | |
| 4,595,715 A * | 6/1986 | Kuze et al. | 523/181 |
| 5,589,524 A * | 12/1996 | Ogita et al. | 523/212 |
| 5,766,507 A * | 6/1998 | Nakai | 252/299.01 |
| 6,153,682 A * | 11/2000 | Bannat et al. | 524/492 |
| 6,552,127 B1 * | 4/2003 | Shimizu et al. | 525/148 |
| 2009/0170994 A1 * | 7/2009 | McConnell et al. | 524/423 |
| 2012/0035312 A1 | 2/2012 | Hasegawa et al. | |

FOREIGN PATENT DOCUMENTS

| | | |
|---|---|---|
| AU | 20470/92 A | 10/1992 |
| CA | 2007823 A1 | 7/1990 |
| EP | 0 386 868 A1 | 9/1990 |
| EP | 2 412 673 A1 | 2/2012 |
| GB | 2267497 A | 12/1993 |
| JP | 54-35897 A | 3/1979 |
| JP | 2-271912 A | 11/1990 |
| JP | 4-4252 A | 1/1992 |
| JP | 04004252 A * | 1/1992 |
| JP | 6-57167 A | 3/1994 |
| JP | 7-118011 A | 5/1995 |
| JP | 2000-256494 A | 9/2000 |
| JP | 2001-164124 A | 6/2001 |
| JP | 2008-144100 A | 6/2008 |
| JP | 2010-228976 A | 10/2010 |
| WO | 2010/110161 A1 | 9/2010 |

OTHER PUBLICATIONS

International Search Report for PCT/JP2011/075710, mailing date of Feb. 14, 2012.
Notification of Transmittal of Translation of the International Preliminary Report on Patentabililty (Form PCT/IB/338) of International Application No. PCT/JP2011/075710 mailed Jun. 13, 2013 with Forms PCT/IB/373 and PCT/ISA/237.
"Safety Data Sheet Snowcal" Jan. 26, 2004, XP55155856. 3 pages.
Extended European Search Report dated Dec. 12, 2014, issued in European Patent Application No. 11845680.5. (6 pages).

* cited by examiner

*Primary Examiner* — Ling Choi
*Assistant Examiner* — David L Miller
(74) *Attorney, Agent, or Firm* — Westerman, Hattori, Daniels & Adrian, LLP

(57) ABSTRACT

Provided is a resin composition that includes calcium carbonate contained in a polyester resin, a polyamide resin, or at thermosetting resin and that achieves good moldability. The resin composition includes calcium carbonate having a pH ranging from 6.0 to 8.5 and a 1N acetic acid-insoluble residue or 30% by mass or more and the calcium carbonate is contained in a polyester resin, a polyamide resin, or a thermosetting resin.

9 Claims, No Drawings

RESIN COMPOSITION

TECHNICAL FIELD

The present invention relates to a resin composition including calcium carbonate that is contained in a polyester resin, a polyamide resin, or a thermosetting resin.

BACKGROUND ART

In order to impart various characteristics such as thermal stability, abrasion resistance, rigidity, impact resistance, and anchor effect, calcium carbonate has been added to a synthetic resin.

Patent Document 1 discloses adding calcium carbonate surface-treated with phosphoric acid to a liquid crystal polyester resin. Specifically, it discloses that using calcium carbonate that is surface-treated by a dry method of dropwise addition of orthophosphoric acid or polyphosphoric acid while stirring calcium carbonate can achieve good adhesiveness to plating and good mechanical strength.

Patent Document 2 discloses a method in which adding condensed phosphoric acid into an aqueous calcium carbonate suspension achieves surface treatment of calcium carbonate.

However, the study on calcium carbonate that is suitably contained in a polyester resin, a polyamide resin, and a thermosetting resin has been insufficient.

CITATION LIST

Patent Literature

Patent Literature 1: JP-A No. 4-4252
Patent Literature 2: JP-A No. 54-35897

SUMMARY OF INVENTION

Technical Problem

An object of the present invention is to provide a resin composition that includes calcium carbonate contained in a polyester resin, a polyamide resin, or a thermosetting resin and that achieves good moldability.

Solution to Problem

A resin composition of the present invention includes calcium carbonate having a pH ranging from 6.0 to 8.5 and a 1N acetic acid-in solable residue of 30% by mass or more, the calcium carbonate being contained in a polyester resin, a polyamide resin, or a thermosetting resin.

By the present invention, the resin composition that includes the calcium carbonate contained in a polyester resin, a polyamide resin, or a thermosetting resin can achieve good moldability.

In the present invention, it is preferable that the calcium carbonate be contained in an amount ranging front 0.1 to 80% by mass.

It is preferable that the calcium carbonate used in the present invention have a BET specific surface area ranging from 0.5 to 100 $m^2/g$.

It is preferable that the calcium carbonate used in the present invention have an average particle size ranging from 0.01 to 30 μm and the average particle size is determined by a laser diffraction particle size analyzer.

Advantageous Effects of Invention

The present invention can provide a resin composition having good moldability.

DESCRIPTION OF EMBODIMENTS

The present invention will now foe described in further detail.

<Calcium Carbonate>

The calcium carbonate used in the present invention has a pH ranging from 6.0 to 8.5 and a 1N acetic acid-insoluble residue of 30% by mass or more. The pH of calcium carbonate is determined by the following manner. Calcium carbonate powder is added to distilled water so as to give dispersion slurry having a concentration of 5% by mass, and the pH value of the obtained calcium carbonate slurry is measured as the pH value of the calcium carbonate powder.

The 1N acetic acid-insoluble residue can be determined by adding 3 g of calcium carbonate to 100 ml of 1N (normality) aqueous acetic acid solution and measuring the amount of an insoluble residue.

A resin composition including calcium carbonate that has a pH ranging from 6.0 to 8.5 and a 1N acetic acid-insoluble residue of 30% by mass or more and that is contained in a polyester resin, a polyaraide resin, or a thermosetting resin, complying with the present invention, achieves good voidability in molding such as extrusion molding and injection molding.

The calcium carbonate used in the present invention more preferably has a pH ranging from 6.5 to 8.0 and even more preferably from 6.7 to 7.8.

The calcium carbonate used in the present invention more preferably has a 1N acetic acid-insoluble residue of 35% by mass or more and even more preferably 40% by mass or more. The upper limit of the 1N acetic acid-insoluble residue is not particularly limited but is typically 95% by mass or less.

The calcium carbonate having the pH value and the 1N acetic acid-insoluble residue can be obtained by, for example, modifying the surface of calcium carbonate. For example, adding condensed phosphoric acid such as pyrophosphoric acid and metaphosphoric acid to an aqueous calcium carbonate suspension and controlling the surface treatment condition enable the production of calcium carbonate showing the pH value and the 1N acetic acid-insoluble residue. However, the calcium carbonate used in the present invention is not limited to such calcium carbonate treated with a condensed phosphoric acid by the wet method.

The calcium carbonate used in the present invention preferably has a BET specific surface area ranging from 0.5 to 100 $m^2/g$. The BET specific surface area more preferably ranges from 0.5 to 30 $m^2/g$ and even more preferably from 0.5 to 15 $m^2/g$.

The calcium carbonate used in the present invention preferably has an average particle size ranging from 0.01 to 30 μm, more preferably from 0.05 to 20 μm, and even more preferably from 0.1 to 10 μm, determined by a laser diffraction particle size analyzer.

The calcium carbonate used in the present invention may be heavy calcium carbonate that is produced by mechanically pulverizing and classifying limestone or may be synthetic calcium carbonate that can be produced by reacting calcium hydroxide slurry with carbon dioxide gas.

<Polyester Resin>

Examples of the polyester resin used in the present invention include polybutylene terephthalate (PBT), polyethylene terephthalate (PET), liquid crystal polyester, and polycarbonate.

<Polyamide Resin>

Examples of the polyamide resin used in the present invention include nylon 6, nylon 66, nylon 11, nylon 12, aromatic nylon, nylon 4T, nylon 6T, and nylon 9T.

<Thermosetting Resin>

Examples of the thermosetting resin used in the present invention include an unsaturated polyester resin, a phenol resin, an epoxy resin, a urea resin, a melamine resin, a polyurethane resin, and a thermosetting imide resin.

<Resin Composition>

The resin composition in the present invention is a composition in which the calcrom carbonate is added to a polyester resin, a polyamide resin, or a thermosetting resin. The calcium carbonate is preferably contained in an amount ranging from 0.1 to 80% by mass, more preferably from 1 to 70% by mass, and even more preferably from 5 to 60% by mass.

Examples of the method for producing the resin composition of the present invention include, but are not necessarily limited to, a method in which the calcium carbonate powder is added to the resin and the whole is mixed and heated for curing, a method in which the resin is dissolved in a solvent, then the calcium carbonate powder is added and mixed, and the solvent is removed, a method in which the resin is heated to form a meltage, then the calcium carbonate powder is added to the meltage, and the whole is mixed, and a method in which a masterbatch of the calcium carbonate powder is added to the resin.

For producing the resin composition of the present invention by melt kneading method, the apparatus may foe a commonly used kneader. Usable examples of the kneader include a single- or multi-screw kneading extruder, a roll, a Banbury mixer, and a pressurizing kneader. Among them, a twin-screw extruder equipped with a side feeder is most preferably used. The kneading condition is not particuiarly limited and the kneading temperature is preferably a temperature 1 to 100° C. higher than the melting point or softening point that is determined by differential scanning calorimetry (DSC) in accordance with JIS K7121.

The resin composition of the present invention may include an appropriate known additive as necessary as long as the object of the present invention is not impaired. Specific examples of such an additive include an antioxidant, a heat stabiliser, a weathering (light) stabilizer, a mold release (lubricating) agent, a crystal nucleating agent, an inorganic filler, a conductive agent, a thermoplastic resin, a thermoplastic elastomer, and a pigment.

EXAMPLES

The present invention will next be described with reference to examples but the present invention is not intended to be limited to the examples.

Production Examples of Calcium Carbonate

Production Example 1

Heavy calcium carbonate was added to water so as to give a concentration of 10% by mass and the mixture was stirred for 10 minutes while controlling the temperature at 20° C., thus preparing calcium carbonate slurry. To the calcium carbonate slurry, an aqueous solution containing pyrophosphoric acid in an amount of 5% by mass was added so that the amount of pyrophosphoric acid was 5 parts by mass with respect to 100 parts by mass of calcium carbonate. The whole was stirred for 10 minutes and then was dehydrated, dried, and pulverized to yield calcium carbonate powder.

The 1N acetic acid-insoluble residue, the pH, the BET specific surface area, and the average particle size of the obtained calcium carbonate were determined.

The 1N acetic acid-insoluble residue and the pH were determined by the measurement methods above.

The BET specific surface area was determined using Flow-Sorb 2200 manufactured by Shimadzu Corporation by the single point method.

The average particle size was determined using a laser diffraction particle size analyzer SALD-2000J manufactured by Shimadru Corporation by wet method and a D50 value was regarded as the average particle size. The refractive index used for calculation of an average particle size was 1.60-0.00i. For dispersing calcium carbonate powdery 0.5 g of a sample was added to 50 ml of 0.2% by mass aqueous sodium lignosulfonate solution and was thoroughly dispersed to yield a sample for measurement. The sample for measurement was sonicated for 1 minute before the measurement and was subjected to the measurement after 1 minute of the sonication.

The 1N acetic acid-insoluble residue and the pH are as shown in Table 1. The BET specific surface area was 2.8 m$^2$/g and the average particle size was 1.8 μm.

Production Example 2

Calcium carbonate powder was obtained in a similar manner to that in Production Example 1 except that synthetic calcium carbonate (BET specific surface area: 11.1 m$^2$/g, average particle size: 0.6 μm) was used in place of heavy calcium carbonate and an aqueous pyrophosphoric acid solution was added so that the amount of pyrophosphoric acid was 6 parts by mass with respect to 100 parts by mass of calcium carbonate.

The 1N acetic acid-insoluble residue and the pH are as shown in Table 1. The BET specific surface area was 11.9 m$^2$/g and the average particle size was 0.6 μm.

Production Example 3

Calcium carbonate powder was obtained in a similar manner to that in Production Example 1 except that an aqueous pyrophosphoric acid solution was added so that the amount of pyrophosphoric acid was 2 parts by mass with respect to 100 parts by mass of calcium carbonate.

The 1N acetic acid-insoluble residue and the pH are as shown in Table 1. The BET specific surface area was 2.8 m$^2$/g and the average particle size was 1.9 μm.

Production Example 4

Calcium carbonate powder was obtained in a similar manner to that in Production Example 1 except that metaphosphoric acid was used in place of pyrophosphoric acid.

The 1N acetic acid-insoluble residue and the pH are as shown in Table 1. The BET specific surface area was 2.8 m$^2$/g and the average particle size was 2.1 μm.

Production Example 5

While stirring heavy calcium carbonate used in Production Example 1 with a Henschel Mixer at 1,000 rpm, pyrophosphoric acid used in Production Example 1 was added dropwise so that the amount of pyrophosphoric acid was 5 parts by mass with respect to 100 parts by mass of calcium carbonate.

The mixture was taken out from the mixer, then was dried at 110° C. for 2 hours, and was classified to yield calcium carbonate powder.

The 1N acetic acid-insoluble residue and the pH are as shown in Table 1.

Production Example 6

Calcium carbonate powder was obtained in a similar manner to that in Production Example 1 except that orthophosphoric acid was used in place of pyrophosphoric acid.

The 1N acetic acid-insoluble residue and the pH are as shown in Table 1. The BET specific surface area was 2.8 $m^2/g$ and the average particle size was 2.0 μm.

Production Example 7

Calcium carbonate powder was obtained by dry treatment in a similar manner to that in Production Example 5 except that orthophosphoric acid was used in place of pyrophosphoric acid.

The 1N acetic acid-insoluble residue and the pH are as shown in Table 1.

(Heavy Calcium Carbonate without Treatment)

The 1N acetic acid-insoluble residue and the pH of the heavy calcium carbonate used in Production Example 1 are as shown in Table 1. The BET specific surface area was 2.8 $m^2/g$ and the average particle size was 1.8 μm.

Table 1 collectively shows the 1N acetic acid-insoluble residues and the pHs of the calcium carbonate powders of the Production Examples 1 to 7 and the heavy calcium carbonate without treatment.

low is supposed to be because the calcium carbonate contained pyrophosphoric acid that did not react with calcium carbonate.

Experiment 1

Preparation of Resin Composition

Examples 1 to 4 and Comparative Examples 1 to 4

The calcium, carbonates of Production Examples 1 to 7 and the heavy calcium carbonate without treatment were added to various resins as below and each moldability was evaluated as below.

[Liquid Crystal Polyester Resin Composition]

Each of 60% by mass of a liquid crystal polyester resin (type II) and 40% by mass of calcium carbonate powder was weighed, then was supplied from a side feeder of a twin-screw extruder (TEM-37BS manufactured by Toshiba Machine Co., Ltd.), and was melted and kneaded using the extruder, thereby yielding a strand of a liquid crystal polyester resin composition. The obtained strand of the resin composition was cut down to prepare chips, and the chips were subjected to injection molding to yield a resin molded article. The extrusion molding and the injection molding were performed in the conditions described below, and the moldability was evaluated.

Extrusion molding: the kneading and molding condition was a temperature of 340° C., a rotation rate of 280 rpm, and a flow rate of 15 kg/hr, and the state of an obtained strand was evaluated.

Injection molding: the injection molding condition was a cylinder temperature of 330° C. and a mold temperature of 150° C., and the state of an injection molded article was evaluated.

TABLE 1

| | Calcium Carbonate as Base | Treatment Agent | Treatment Method | Acetic Acid-Insoluble Residue | pH |
|---|---|---|---|---|---|
| Production Example 1 | Heavy Calcium Carbonate | Pyrophosphoric Acid | Wet Method | 55.2% | 7.0 |
| Production Example 2 | Synthetic Calcium Carbonate | Pyrophosphoric Acid | Wet Method | 48.4% | 7.4 |
| Production Example 3 | Heavy Calcium Carbonate | Pyrophosphoric Acid | Wet Method | 45.2% | 7.8 |
| Production Example 4 | Heavy Calcium Carbonate | Metaphosphoric Acid | Wet Method | 52.6% | 7.4 |
| Production Example 5 | Heavy Calcium Carbonate | Pyrophosphoric Acid | Dry Method | 35.7% | 5.8 |
| Production Example 6 | Heavy Calcium Carbonate | Orthophosphoric Acid | Wet Method | 0.7% | 8.2 |
| Production Example 7 | Heavy Calcium Carbonate | Orthophosphoric Acid | Dry Method | 4.1% | 6.9 |
| Heavy Calcium Carbonate without Treatment | Heavy Calcium Carbonate | — | — | 0.2% | 9.5 |

The results shown in Table 1 clearly reveal that the calcium carbonates of Production Examples 1 to 4, which had a pH ranging from 6.0 to 8.5 and a 1N acetic acid-insoluble residue of 30% by mass or more, were the calcium carbonate complying with the present invention. The calcium carbonate of Production Example 5 treated with pyrophosphoric acid by dry method had a 1N acetic acid-insoluble residue of 30% by mass or more but a pH of 5.8 and thus was out of the range defined by the present invention. The reason why the pH was

[Polybutylene Terephthalate (PBT) Resin Composition]

A polybutylene terephthalate resin composition was obtained in a similar manner to the above except that a polybutylene terephthalate resin (manufactured by Polyplastics Co., Ltd., trade name "Duranex 2002") was used in place of the liquid crystal polyester resin and the extrusion molding and the injection molding were performed in the conditions described below. The obtained resin composition was subjected to injection molding to yield a resin molded article.

Extrusion molding: the kneading and molding condition was a temperature of 230° C., a rotation rate of 300 rpm, and a flow rate of 15 kg/hr, and the state of an obtained strand was evaluated.

Injection molding: the injection molding condition was a cylinder temperature of 230° C. and a mold temperature of 70° C., and the state of an injection molded article was evaluated.

[Aromatic Polyamide Resin Composition]

An aromatic polyamide resin composition was obtained in a similar manner to the above except that an aromatic polyamide resin (nylon 6T) was used in place of the liquid crystal polyester resin and the extrusion molding and the injection molding were performed in the conditions described below. The obtained resin composition was subjected to injection molding to yield a resin molded article.

Extrusion molding: the kneading and molding condition was a temperature of 300° C., a rotation rate of 300 rpm, and a flow rate of 15 kg/hr, and the state of an obtained strand was evaluated.

Injection molding: the injection molding condition was a cylinder temperature of 310° C. and a mold temperature of 70° C., and the state of an injection molded article was evaluated.

[Unsaturated Polyester Resin Composition]

Each of 60% by mass of an unsaturated polyester resin (manufactured by Japan U-PiCA Company, Ltd., trade name "U-PiCA 7123") and 40% by mass of calcium carbonate powder was weighed and then was kneaded at 25 to 30° C. using a pressurizing kneader to yield an unsaturated polyester resin composition. The obtained resin composition was subjected to transfer molding to yield a resin molded article. The transfer molding was performed in the condition below, and the moldability was evaluated.

Transfer molding: the transfer molding condition was a mold temperature of 150° C., an injection pressure of 5 MPa, an injection time of 30 seconds, a mold clamping pressure of 15 MPa, and a curing time of 120 seconds, and the state of a transfer molded article was evaluated.

[Polyethylene Resin Composition]

A polyethylene resin composition was obtained in a similar manner to the above except that a polyethylene resin (manufactured by Japan Polyethylene Corporation, trade name "Novatec LD LJ803") was used in place of the liquid crystal polyester resin and the extrusion molding and the injection molding were performed in the conditions described below. The obtained resin composition was subjected to injection molding to yield a resin molded article.

Extrusion molding: the kneading and molding condition was a temperature of 180° C., a rotation rate of 300 rpm, and a flow rate of 15 kg/hr, and the state of an obtained strand was evaluated.

Injection molding: the injection molding condition was a cylinder temperature of 190° C. and a mold temperature of 40° C., and the state of an injection molded article was evaluated.

[Evaluation Standard for Extrusion Moldability]

The extrusion moldability was evaluated based on the standard below.

o: Extrusion molding was performed without any trouble.

x: A strand obtained had defects such as foaming and a rough surface.

xx: A composition was failed to be extruded.

[Evaluation Standard for Injection Moldability]

The injection moldability was evaluated based on the standard below.

o: ft molded article had no defect in appearance.

x: A molded article had defects such as a crack and a rough surface.

xx: A composition was failed to be injected.

[Evaluation Standard for Transfer Moldability]

The transfer moldability was evaluated based on the standard below.

o: A molded article had no defect in appearance.

x: A molded article had defects such as a crack and a rough surface.

xx: A composition was failed to be extruded.

Table 2 shows the evaluation results.

TABLE 2

| | | Liquid Crystal Polyester | | PBT | | Aromatic Polyamide | | Unsaturated Polyester Transfer | Polyethylene | |
|---|---|---|---|---|---|---|---|---|---|---|
| | Calcium Carbonate | Extrusion Moldability | Injection Moldability | Extrusion Moldability | Injection Moldability | Extrusion Moldability | Injection Moldability | Moldability | Extrusion Moldability | Injection Moldability |
| Example 1 | Production Example 1 | o | o | o | o | o | o | o | o | o |
| Example 2 | Production Example 2 | o | o | o | o | o | o | o | o | o |
| Example 3 | Production Example 3 | o | o | o | o | o | o | o | o | o |
| Example 4 | Production Example 4 | o | o | o | o | o | o | o | o | o |
| Comparative Example 1 | Production Example 5 | X | X | X | X | X | X | X | o | o |
| Comparative Example 2 | Production Example 6 | X | X | X | X | X | X | X | o | o |
| Comparative Example 3 | Production Example 7 | X | X | X | X | X | X | X | o | o |

TABLE 2-continued

| | Calcium Carbonate | Liquid Crystal Polyester | | PBT | | Aromatic Polyamide | | Unsaturated Polyester Transfer Moldability | Polyethylene | |
|---|---|---|---|---|---|---|---|---|---|---|
| | | Extrusion Moldability | Injection Moldability | Extrusion Moldability | Injection Moldability | Extrusion Moldability | Injection Moldability | | Extrusion Moldability | Injection Moldability |
| Comparative Example 4 | Heavy Calcium Carbonate without Treatment | XX | XX | XX | XX | XX | XX | XX | ○ | ○ |

The results shown in Table 2 clearly reveal that the various resin compositions of Examples 1 to 4 including the calcium carbonates of Production Examples 1 to 4 that are the calcium carbonate complying with the present invention had better moldability than those of the resin compositions of Comparative Examples 1 to 4.

The polyethylene resin compositions of Comparative Examples 1 to 4 had good moldability. This reveals that the advantageous effect of the present invention is conspicuous for a polyester resin, a polyamide resin, and a thermosetting resin.

Experiment 2

Examples 5 to 8

By using the calcium carbonates of Production Examples 1 to 4, respective calcium carbonates were added to a liquid crystal polyester resin in a similar manner to that in Experiment 1 to yield resin compositions of Examples 5 to 8.

The obtained resin composition was subjected to injection molding to give a dumbbell for evaluation, and the flexural strength, the flexural modulus, the tensile strength, the impact strength, and the heat deflection temperature (HDT) were determined.

The flexural modulus (MPa) and the flexural strength (MPa) were determined in accordance with ASTM D790.

The tensile strength (MPa) was determined in accordance with ASTM D638.

For the impact strength (J/m), the notched Izod impact strength was determined in accordance with ASTM D256.

The HDT was determined at a load of 1.8 MPa in accordance with ASTM D648.

Comparative Example 5

The calcium carbonate of Production Example 6 was added to a liquid crystal polyester resin in a similar manner to the above, and the flexural strength, the flexural modulus, the tensile strength, the impact strength, and the HDT were determined in a similar manner to the above.

Example 9

The calcium carbonate of Production Example 1 was added to a PBT resin in a similar manner to the above, then the mixture was subjected to extrusion molding to give a dumbbell for evaluation, and the flexural strength, the flexural modulus, the tensile strength, the impact strength, and the HDT were determined.

Example 10

The calcium carbonate or Production Example 1 was added to an aromatic polyamide resin in a similar manner to the above, then the mixture was subjected to extrusion molding to give a dumbbell for evaluation, and the flexural strength, the flexural modulus, the tensile strength, the impact strength, and the HDT were determined.

Comparative Example 6

The heavy calcium carbonate without treatment was added to a liquid crystal polyester resin in a similar manner to the above, then the mixture was subjected to injection molding to give a dumbbell for evaluation, and the flexural strength, the flexural modulus, the tensile strength, the impact strength, and the HDT were determined.

Comparative Example 7

The synthetic calcium carbonate without treatment was added to a liquid crystal polyester resin in a similar manner to the above, then the mixture was subjected to injection molding to give a dumbbell for evaluation, and the flexural strength, the flexural modulus, the tensile strength, the impact strength, and the HDT were determined.

Comparative Example 8

The heavy calcium carbonate without treatment was added to at PBT resin in a similar manner to the above, then the mixture was subjected to injection molding to give a dumbbell for evaluation, and the flexural strength, the flexural modulus, the tensile strength, the impact strength, and the HDT were determined.

Comparative Example 9

The heavy calcium carbonate without treatment was added to an aromatic polyamide resin in a similar manner to the above, then the mixture was subjected to injection molding to give a dumbbell for evaluation, and the flexural strength, the flexural modulus, the tensile strength, the impact strength, and the HDT were determined.

Table 3 shows the flexural strength, the flexural modulus, the tensile strength, the impact strength, and the HDT, determined as above.

TABLE 3

|  | Calcium Carbonate | Resin | Flexural Strength (MPa) | Flexural Modulus (MPa) | Tensile Strength (MPa) | Impact Strength (J/m) | HDT (° C.) |
| --- | --- | --- | --- | --- | --- | --- | --- |
| Example 5 | Production Example 1 | Liquid Crystal Polyester | 134 | 5200 | 100 | 45 | 214 |
| Example 6 | Production Example 2 | Liquid Crystal Polyester | 135 | 5150 | 101 | 42 | 210 |
| Example 7 | Production Example 3 | Liquid Crystal Polyester | 133 | 5130 | 101 | 43 | 213 |
| Example 8 | Production Example 4 | Liquid Crystal Polyester | 130 | 5110 | 98 | 40 | 211 |
| Comparative Example 5 | Production Example 6 | Liquid Crystal Polyester | 131 | 5100 | 98 | 40 | 212 |
| Example 9 | Production Example 1 | PBT | 95 | 4500 | 49 | 40 | 120 |
| Example 10 | Production Example 1 | Aromatic Polyamide | 150 | 5500 | 100 | 120 | 180 |
| Comparative Example 6 | Heavy Calcium Carbonate without Treatment | Liquid Crystal Polyester | 105 | 4870 | 80 | 31 | 201 |
| Comparative Example 7 | Synthetic Calcium Carbonate without Treatment | Liquid Crystal Polyester | 80 | 3900 | 75 | 25 | 190 |
| Comparative Example 8 | Heavy Calcium Carbonate without Treatment | PBT | 70 | 3000 | 45 | 30 | 80 |
| Comparative Example 9 | Heavy Calcium Carbonate without Treatment | Aromatic Polyamide | 110 | 4000 | 80 | 65 | 110 |

As shown in Table 3, the liquid crystal polyester resins, the PBT resin, and the aromatic polyamide resin containing Production Examples 1 to 4 that are the calcium carbonate complying with the present invention had a higher flexural strength, a higher flexural modulus, a higher tensile strength, a higher impact strength, and a higher HDT than those of the respective resin compositions of Comparative Examples 5 to 9. Hence, using the calcium carbonate complying with the present invention also intends to improve the mechanical strength.

What is claimed is:

1. A resin composition, comprising:
   calcium carbonate and a resin,
   wherein the calcium carbonate is contained in the resin,
   wherein the calcium carbonate has a pH ranging from 6.0 to 8.5,
   wherein the calcium carbonate has a 1N acetic acid-insoluble residue of 40% by mass or more, and
   wherein the resin is at least one selected from the group consisting of polybutylene terephthalate, polyethylene, terephthalate, liquid crystal polyester, polycarbonate, and a polyamide resin.

2. The resin composition according to claim 1, wherein the calcium carbonate is contained in an amount ranging from 0.1 to 80% by mass.

3. The resin composition according to claim 1, wherein the calcium carbonate has a BET specific surface area ranging from 0.5 to 100 $m^2/g$.

4. The resin composition according to claim 1, wherein the calcium carbonate has an average particle size ranging from 0.01 to 30 μm and the average particle size is determined by a laser diffraction particle size analyzer.

5. The resin composition according to claim 1, wherein the resin is polybutylene terephthalate.

6. The resin composition according to claim 1, wherein the resin is polyethylene terephthalate.

7. The resin composition according to claim 1, wherein the resin is liquid crystal polyester.

8. The resin composition according to claim 1, wherein the resin is polycarbonate.

9. The resin composition according to claim 1, wherein the resin is a polyamide resin.

* * * * *